United States Patent [19]

Julian et al.

[11] 4,331,747

[45] May 25, 1982

[54] ELECTRIC STORAGE BATTERIES

[75] Inventors: Keith Julian, Wilmslow; Raymond C. Irving, Farnworth, nr. Bolton, both of England

[73] Assignee: Chloride Group Limited, London, England

[21] Appl. No.: 170,172

[22] Filed: Jul. 18, 1980

[30] Foreign Application Priority Data

Jul. 20, 1979 [GB] United Kingdom ................ 7925363

[51] Int. Cl.³ .......................................... H01M 4/72
[52] U.S. Cl. .................................... 429/160; 429/234
[58] Field of Search ............... 429/152, 153, 154, 155, 429/160, 161, 149, 234

[56] References Cited

U.S. PATENT DOCUMENTS

| | | | |
|---|---|---|---|
| 2,684,989 | 7/1954 | Wilburn | 429/154 |
| 4,022,951 | 5/1977 | McDowall | 429/234 |
| 4,209,577 | 6/1980 | McDowall et al. | 429/234 |
| 4,239,839 | 12/1980 | McDowall et a. | 429/154 |

Primary Examiner—Donald L. Walton
Attorney, Agent, or Firm—Oblon, Fisher, Spivak, McClelland & Maier

[57] ABSTRACT

A battery includes a plurality of frames of plastics material, each frame comprising a perimeter member and one or more division elements together defining two or more active material support spaces. The frames are arranged in a stack and the perimeter member and division elements of each frame are connected to those of adjacent frames. Each support space receives an electrode, and every alternate division element has on one side two connector recesses extending over a minor proportion of its length, connector recesses in adjacent frames being in division elements that are offset from one another. The spaces on each side of each division element receive electrodes which are connected together by connectors which are received in the connector recesses. Preferably that portion of each division element which overlies a connector recess in the adjacent frame has an elongate recess in it, the connector recess and elongate recess containing a sealing material.

8 Claims, 5 Drawing Figures

ELECTRIC STORAGE BATTERIES

The present invention relates to electric storage batteries of the type disclosed in British Pat. Specification No. 1430205, and relates in particular to a novel construction of frames for forming such batteries.

That prior specification discloses an electric storage battery formed from a plurality of frames, each of which comprises a continuous perimeter member of mouldable plastics material, and preferably of rectangular shape, which defines a plurality of active material support spaces which are spaced from each other by a number of division elements, which are preferably parallel to two of the sides of the rectangular perimeter member. The active material in the support spaces of each frame is of alternating polarity and carried by a metallic grid, which grid passes through the entire length of every alternate division element so as to form intercell connectors, thus obviating the requirement of subsequently forming or attaching such connectors. The division elements are bars of mouldable plastics material which in the completely assembled battery are secured to juxtaposed bars of the adjacent frames to form intercell partitions.

It will be appreciated that such a construction, in which each frame incorporates a part of every cell of the battery permits great flexibility of planning and production in that batteries of widely varying capacities, i.e. ampere hours, may be made up from the identical frames merely by varying the number of frames that are used.

However before assembling a battery the individual frames must be made up, for instance in a jig, by laying side by side the appropriate number of single electrode grids and bipolar electrode grids one half of which carries positive active material and the other half of which carries negative active material. The perimeter member and the division elements are then moulded around the grids to form a unitary frame. It will be appreciated that each bipolar electrode grid will have a central bar of plastics material moulded onto it separating the positive and negative active material areas, which bars then have to be connected to the corresponding bars of other frames to form the intercell partitions.

It is notoriously difficult to mould plastics material around metallic grids such that an electrolyte tight metal-plastics seal is formed, due to shrinkage of the plastics material. Thus in the battery disclosed in the prior specification, which is flooded, that is to say there is free electrolyte within the battery, it is to be expected that there will be a tendency for leakage paths to be present between one cell and the next constituted by the gaps between the division elements and the material of the bipolar electrode grids. Electrolyte paths between cells in a flooded battery constitute current leakage paths, and the performance and service life of the battery is thereby severely degraded. According to one aspect of the present invention a multicell electric storage battery includes a plurality of frames of insulating material for example thermoplastics plastics material, each frame comprising a perimeter member and one or more division elements, the perimeter member and the division elements together defining two or more active material support spaces, the frames being arranged in a stack extending in a direction normal to the plane of the frames, the perimeter member and division elements of each frame being connected to those of the adjacent frames, each active material support space receiving an electrode, and every alternate division member having on one side a connector recess extending over a minor proportion of its length, connector recesses on adjacent frames being in division elements that are offset from one another, the spaces on each side of each division element in which a connector recess is formed receiving electrodes which are connected together by a connector which is received in the recess in the division element.

The fact that the connector members extend over only a minor portion of the length of the division elements results in the possible cross-sectional area of any leakage path being substantially reduced by comparison to a construction in which the electrode grids pass through the entire length of the division elements.

In the preferred embodiment of the invention that portion of each division element of each frame which overlies a connector recess in the division elements of the adjacent frames has an elongate recess formed in it which communicates with the exterior of the perimeter member, the connector recess and the longitudinal recess being filled with a sealing material which seals the connector in the connector recess. The provision of a longitudinal recess in each division element at the point where it overlies a connector recess in the adjacent frame permits a sealing material, such as epoxy resin, to be injected into the longitudinal recess and to contact and seal the connector within the connector recess and thus virtually eliminate the possibility of a leakage path around the connector.

The battery construction in accordance with the present invention may be used very conveniently in the so called "recombinant" form in which the gases evolved in the battery during operation or charging, at least at relatively low charging rates such as C/20, are induced to recombine within the battery and are not vented to atmosphere. Such batteries contain substantially no free electrolyte, substantially all the electrolyte that is present in each cell being absorbed or adsorbed in the active electrode material and in the separator material, preferably microfine glass fibre material, which is placed between adjacent electrode areas of adjacent frames. The separator material is preferably a compressible absorbent fibrous material resistant to the electrolyte and having an electrolyte absorption ratio of at least 100%. The electrolyte for each cell, in the recombinant version of the battery, is present in an amount such as to be substantially entirely absorbed by the cell components at least when the cell is fully discharged.

In the most preferred condition of the cells the amount of electrolyte is not sufficient to saturate the pores in the electrodes and in the separators.

The ratio of X to Y may be in the range 6:1 to 1:1 e.g. 5.5:1 to 1.5:1, or more preferably 4:1 to 1.5:1 where X is the total pore volume of the separators in the dry state and Y is the total pore volume of the positive and negative active materials in the dry fully charged state.

The electrolyte/active material ratio is desirably at least 0.05 e.g. at least 0.06 or at least 0.10 and is the ratio of $H_2SO_4$ in grams to the lead in the positive and negative active material calculated as grams of lead. It is preferably in the range 0.10 to 0.60 especially 0.11 to 0.55 e.g. 0.20 to 0.50.

The ratio of negative to positive active material on the basis of the weight of active material calculated as lead may be in the range 0.5:1 to 1.5:1 e.g. 0.6:1 to 1.4:1.

The use of ratios below 1:1 is contrary to what is conventional in recombinant batteries but we find that recombinant operation can be achieved at these ratios and they have the advantage of providing more positive active material for the same cell volume. We thus prefer to use ratios in the range 0.6:1 to 0.99:1 e.g. 0.7:1 to 0.9:1.

As mentioned above the separator material is a compressible absorbent fibrous material having an electrolyte absorption ratio of at least 100% e.g. 100 to 200% especially 110 to 170%. It is electrically non conducting and electrolyte-resistant.

Electrolyte absorption ratio is the ratio, as a percentage, of the volume of electrolyte absorbed by the wetted portion of the separator material to the dry volume of that portion of the separator material which is wetted, when a strip of the dry separator material is suspended vertically above a body of aqueous sulphuric acid electrolyte of 1.270 SG containing 0.01% by weight sodium lauryl sulphonate with 1 cm of the lower end of the strip immersed in the electrolyte after a steady state wicking condition has been reached at 20° C. at a relative humidity of less than 50%.

The thickness of the separator material is measured with a micrometer at a loading of 10 kilopascals (1.45 psi) and a foot area of 200 square millimeters (in accordance with the method of British standard specification No. 3983). Thus the dry volume of the test sample is measured by multiplying the width and length of the sample by its thickness measured as described.

It is also preferred that the separator material should have a wicking height of at least 5 cms on the above test, namely that the electrolyte should have risen to a height of at least 5 cms above the surface of the electrolyte into which the strip of separator material dips when the steady state condition has been reached, so that good electrolyte distribution is achieved in each cell.

We find that these two requirements are met by fibrous blotting paper-like materials made from fibres having diameters in the range 0.01 microns or less up to 10 microns, the average of the diameters of the fibres being less than 10 microns, and preferably less than 5 microns, the weight of fibre density ratio, namely the ratio of the weight of the fibrous material in grams/square meter to the density in grams/cubic centrimeter of the material from which the individual fibres are made preferably being at least 20 preferably at least 30 and especially at least 50.

This combination of properties gives a material which is highly resistant to "treeing through, " namely growth of lead dendrites from the positive electrode in a cell to the negative electrode producing short circuits, whilst at the same time even when containing large amounts of absorbed electrolyte, still providing a substantial degree of gas transmission capability.

Recombinant lead acid batteries, in which gas recombination is used to eliminate maintenance during use, operate under superatmospheric pressure e.g. from 1 bar (atmospheric pressure) upwards and due to the restricted amount of electrolyte, the high electrolyte absorption ratio of the separator, and the higher electrochemical efficiency of the negative electrode, the battery operates under the so-called "oxygen cycle". Thus oxygen generated, during charging or overcharging, at the positive is transported, it is believed, through the gas phase in the separator to the surface of the negative which is damp with sulphuric acid and there recombines with the lead to form lead oxide which is converted to lead sulphate by the sulphuric acid. Loss of water is thus avoided as is excess gas pressure inside the battery.

The higher electrochemical efficiency of the negative active material enables the negative electrode to effect recombination of the oxygen produced by the positive electrode even at the beginning of the charge cycle. Thus it may not be necessary to have an excess weight of negative active material compared to the positive active material.

However recombinant operation of the battery may be facilitated by the use of a number of features in combination.

Thus firstly one desirably provides that, under the charge and discharge conditions, under which the battery is designed to operate, the capacity of the negative electrodes in each cell will normally and desirably always be in excess of that of the positive electrodes.

The electrochemical efficiency of the negative electrodes is in general greater than that of the positive electrodes but it must be born in mind that the efficiency of the negative electrodes drops more rapidly than that of the positive electrodes both as the cells undergo increasing numbers of cycles of charge and discharge and as the temperature of operation is reduced below ambient (i.e. 25° C.). Excess negative capacity may thus conveniently be ensured by providing an excess of negative active material (calculated as lead) compared to the positive active material in each cell.

Secondly one provides a restricted amount of electrolyte as defined above and thirdly one provides a separator, desirably having a high electrolyte absorption ratio as also described and defined above, which is compressible, so as to conform closely to the surfaces of the electrodes, and which has wicking or capillary activity, whereby transmission of electrolyte and electrolytic conduction between the electrodes is facilitated and preserved independent of the orientation of the cell, whilst gas transmission through the open spaces in the separator is maintained so that adequate and rapid gas transmission between the electrodes is also ensured.

Use of a fibrous separator having very small fibre diameters ensures that the open spaces in the separator are highly tortuous thus fulfilling the requirement that the separator resist "treeing through" as described above.

If the charging conditions generate oxygen at a faster rate than it can be transported to the negative and react thereat, then the excess oxygen is vented from the battery.

At charging rates not in excess of C/20 substantially all of the oxygen as generated is recombined within the battery and is not vented. Thus typically water losses do not exceed 5 ml for a system in which on a Faradaic basis one would have expected a water loss of 125 ml. Thus the water loss is less than 5% of that expected on a Faradaic basis.

The amount of electrolyte added is not highly critical since it is observed that if a slight excess of electrolyte is added above that required to saturate the porosity of the cell components the recombination mechanism is suppressed and electrolyte is lost by electrolysis until the electrolyte volume has reached the correct amount for the cell in question, i.e. the cell porosity has reached the correct degree of unsaturation, when the recombination mechanism comes into operation again and a steady state recombination condition related to the rate of charging which is used is established.

The pack of frames is preferably located in a container with a lid sealed thereto and if desired end plates of electrolyte resistant polymer material may be located over the ends of the pack. The pack of battery elements, and the container if used, is desirably provided with gas venting means in the forms of a pressure relief valve so that air cannot obtain access to the interior of the battery although excess gas generated therein can escape to atmosphere.

The perimeter member of the frames which will be juxtaposed to the lid or form the upper surface of the battery in use may be formed with filling apertures to permit electrolyte to be introduced into each cell. The electrolyte may be added by immersing the battery in a bath of electrolyte, evacuating it and optionally then transferring the saturated cells to the container. Alternatively the cells may be located in the container in the dry state, the lid sealed on, the cells evacuated and the electrolyte injected into the cells preferably in an amount of $(X+Y)$ or $1.1\ (X+Y)$ to $1.2\ (X+Y)$ or $1.5\ (X+Y)$.

The electrodes may be separate rectilinear plates e.g. cast grids, or cast or rolled sheets, slit and expanded to make expanded mesh grids or cast or rolled sheets punched to produce perforated grids.

Conventional grid alloys may be used to make the current conducting supports for the electrodes but materials such as pure lead or lead/calcium alloys e.g. with up to 0.1% calcium or lead/calcium/tin alloys e.g with up to 0.1% calcium and up to 1.0% tin are preferred.

Further features and details of the invention will be apparent from the following description of a 12 volt lead acid storage battery which is given by way of example only with reference to the accompanying drawings.

The battery is made from a number of frames, which in accordance with a preferred aspect of the present invention are formed in pairs as a one piece injection moulding of polypropylene connected by an integral hinge 10. Each frame is of rectangular shape having an outer perimeter member 12 defining a space which is spanned by five equispaced cell element defining strips 14 parallel to two of the sides of the perimeter member.

The perimeter member and cell element defining strips together define six equally sized rectangular cell elements or active material support spaces. Each frame has external dimensions of about 250 mm by 200 and is 5 mm thick, whilst the perimeter member is about 7 mm wide and the cell element defining strips are 6 mm wide.

Figure 1:
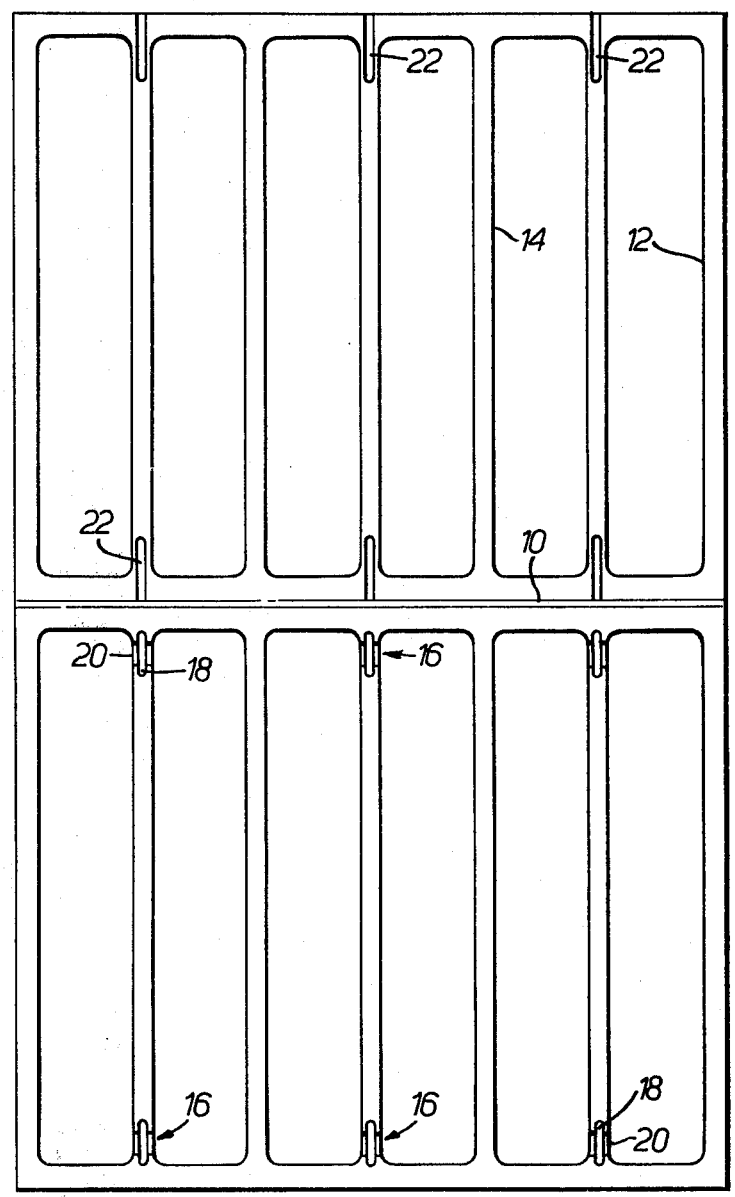
FIG. 1 is a plan view of two frames for use in the battery.

As may be seen in FIG. 1 the lower frame of the pair has in each of the two outer and the central cell element defining strips 14 a pair of connector recesses 16, each adjacent the perimeter member extending across the full width of the strips 14 and having an overall length of about 13 mm. Each connector recess comprises a relatively deep central groove 18 on either side of which is a somewhat shallower recess 20 whose length is about 10 mm. The upper frame, as seen in FIG. 1, has elongate recesses 22 communicating with the exterior of the perimeter member formed in its cell element defining strips in positions such that a recess 22 overlies each of the connector recesses 16, when the surfaces of the two frames seen in FIG. 1 are placed in contact.

Figure 2:
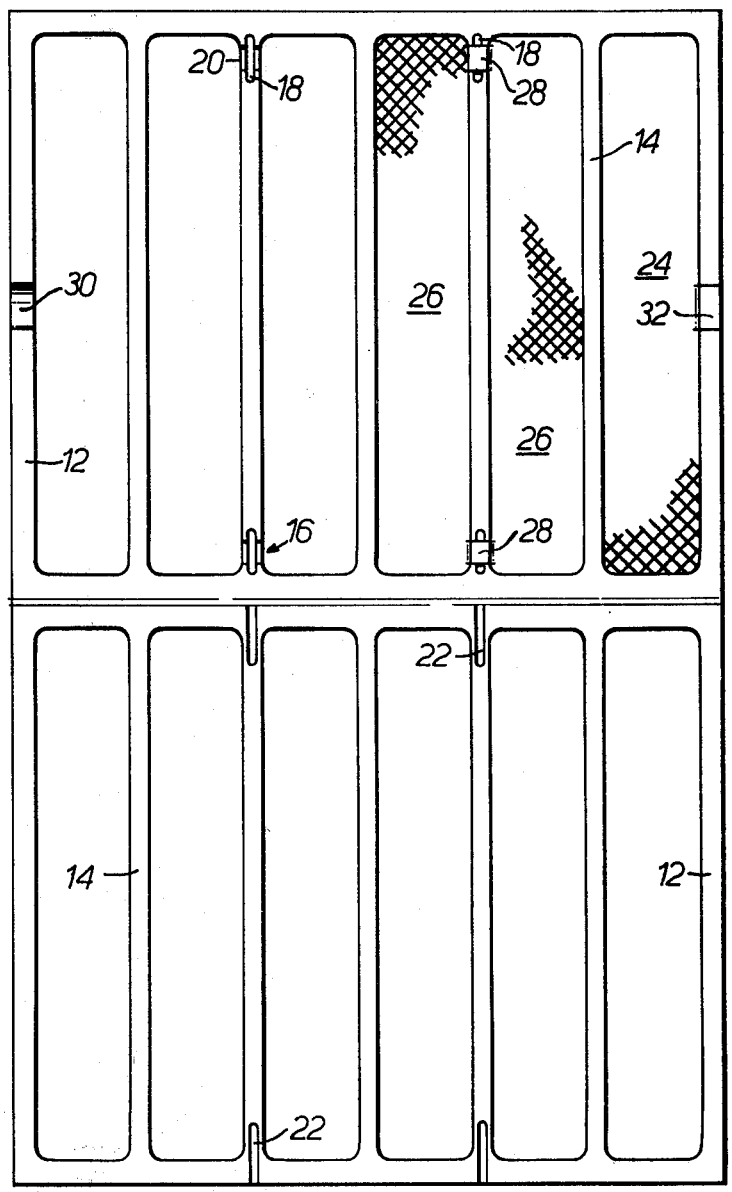
FIG. 2 is an underneath plan view of the two frames shown in FIG. 1, showing an end grid element and a bipolar grid element in position.
Figure 3:
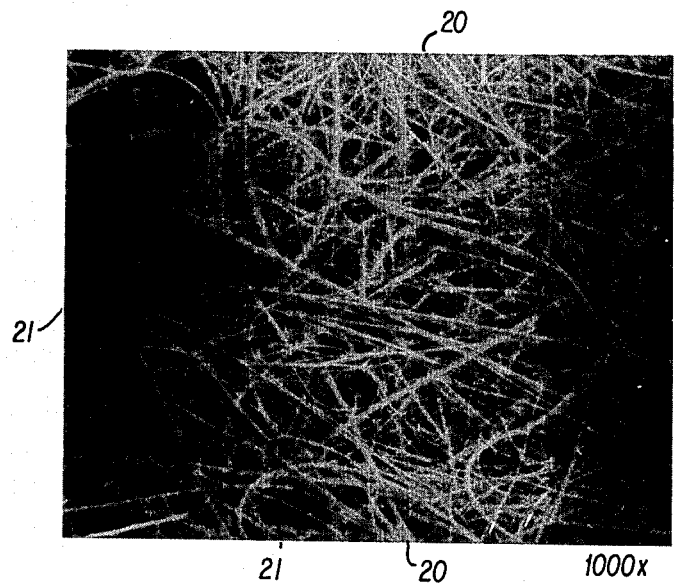
FIG. 3 is an electron scanning photomicrograph of a preferred separator material at 1000 fold magnification.
Figure 4:
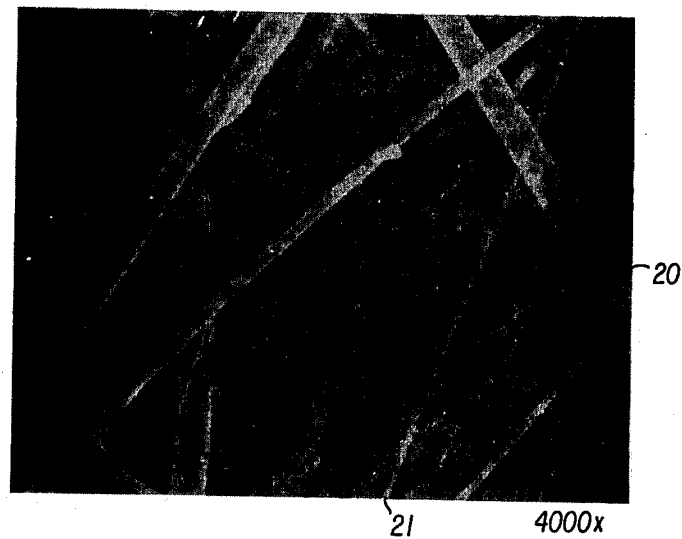
FIG. 4 is a view similar to FIG. 7 at 4000 fold magnification.

FIG. 2 shows the rear surface of the two frames of FIG. 1, and as may be seen, that frame which has on one surface connector recesses 16 has on its other surface elongate recesses 22 and vice versa. In any one frame the connector recesses and the elongate recesses are formed in strips 14 that are laterally offset from one another.

When making up a battery from such frames, current conductors comprising electrode grids 23 carrying active material are inserted and retained in the frames. For this purpose expanded lead grids are used, either in the form of single unipolar grids 24 (of which one is shown in FIG. 2) whose shape corresponds to that of an active material support space carrying either positive or negative active material as required, or in the form of double bipolar grids 26 (of which one is shown in FIG. 2), whose shape corresponds to that of two active material support spaces, whose two halves are connected by two connector portions 28 whose size and position corresponds to that of the connector recesses, the two halves of the bipolar grids carrying positive and negative active material respectively.

A battery is made up as follows: three bipolar electrode grids are placed on the lower frame seen in FIG. 1, such that their connector portions are received in the connector recesses 16, and the polarity of the grids alternate across the width of the frame. The depth of the connector recess and the thickness of the electrode grids are such that the grids lie wholly within the space defined by the frame. A separate strip 27 of microfine glass fibre separator material of the type described above is then laid over each active material support space such that the surface of the perimeter member and the division elements are at the most only partially covered by the edges of the strips of separator material. The visible surfaces of the two frames shown in FIG. 1 are then connected together, for instance by hotplate welding, retaining the electrode grids and separators between the two frames. If one imagines that the upper frame in FIG. 1 is placed on the lower frame, the upper surface of the two frame stack will look like the upper frame shown in FIG. 2.

As will be seen connector recesses are formed in the cell element defining strips of this surface of this frame in the other surface of which elongate recesses are not formed. Electrode grids are now placed in the active material support areas of this frame, but in this case a unipolar grid is placed in each of the two outer support areas, and two bipolar grids in the remaining four central areas. The polarity of these grids is again arranged to alternate across the width of the frame, and also to be of reverse polarity to the electrode grids of the adjacent frame to which they are opposed. Six strips of separator material are then placed over the electrode grids and a further frame is then secured to the stack. It will be appreciated that the lower surface of the further frame will look like the visible surface of the lower frame in FIG. 2, and that its upper surface will be that of the lower frame in FIG. 1.

Figure 5:
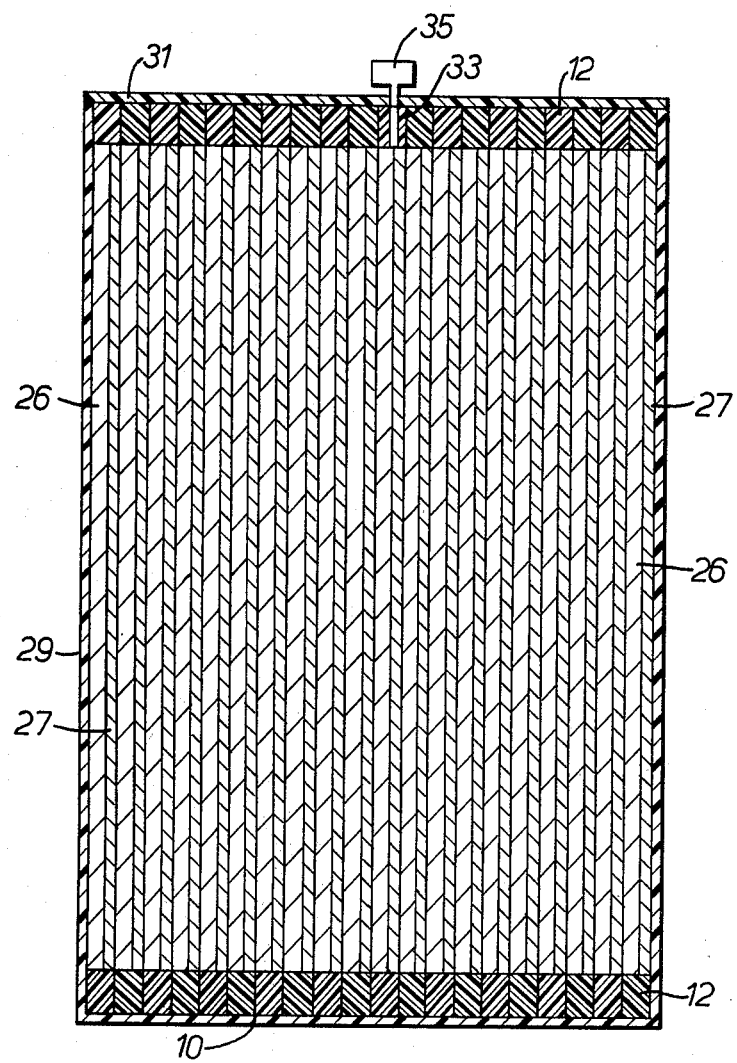
FIG. 5 is a transverse section through a battery in accordance with the invention showing all the frames, electrodes and separators of one cell.

The process is now continued until a battery of the desired capacity is formed. The finished stack of frames has a top, bottom and two end walls, and two side walls may be provided by securing, e.g. welding, a plastics sheet to each of the sides of the stack. It will be appreciated that an outer container for the battery is not strictly necessary but is desirable to ensure that the plate assemblies are held pressed tightly together since this facilitates operation in a gas recombinant mode. Such a container 29 is shown in FIG. 5, sealed by a lid 31.

As the assembly is proceeding, or when it is complete, a sealant such as epoxy resin is injected into each recess 22. This passes down around the connectors 28 and fills the grooves 18, thus completely sealing adjacent cells from each other.

Terminal connections are of course required for the battery, and for this purpose every alternate frame is provided with a connector recess 30 in each limb of the perimeter member parallel to the cell element defining strips in that surface in which the connector recesses are formed. Those electrode grids which are placed in the support areas adjacent the connector recesses are provided with a terminal projection 32 extending in the plane of the grids which is received in the recess 30 and passes out of the battery. The terminal projections may be sealed in the terminal recesses, for instance by means of epoxy resin, and are connected together by an external terminal strap to form a battery terminal.

The separator material is highly absorbent blotting paper-like short staple fibre glass matting about 1 mm thick. As seen in FIGS. 7 and 8 there are fibres 61 as thin as 0.2 microns and fibres 60 as thick as 2 microns in diameter, the average diameter of the fibres being about 0.5 microns.

It will be observed that the material whilst highly absorbent still has a very large amount of open space between the individual fibres. The material when tested for its wicking and electrolyte absorption capabilities as described above absorbs electrolyte so that the liquid has wicked up to a height of 20 cms after 2 hours and this is the steady state condition. This 20 cms of material absorbs 113% of its own dry volume of electrolyte, and this is its electrolyte absorption ratio.

The separator material weighs 200 grams/square meter and has a porosity of 90-95% as measured by mercury intrusion penetrometry. The density of the glass from which the fibres of the separator are made is 2.69 gr/cc the weight to fibre density ratio is thus 74.

As mentioned above the use of a reduced amount of electrolyte and microfine glass separator permits the battery to be of "recombinant" type. For effective recombination of evolved gases to occur the separators should be under a certain compressive pressure to assure that their capillarity or wicking action is brought into play whereby adequate supply of electrolyte is provided to the entire surface of the active material carried by the electrode grids. In addition the battery should be designed to operate at superatmospheric pressure. The battery is therefore preferably filled with the appropriate amount of electrolyte at the time of manufacture, through a hole 33 in each cell which may either be formed in one of the frames, or which may be subsequently formed, for instance by drilling. Each cell is then fitted with a safety vent 35, designed to vent the cell at a pressure in excess of 1 bar, either in the filling hole, or in a separate hole. The safety vent is intended during normal operation of the battery not to function, but merely to act as a relief valve if the rate of evolution of gas should be greater than the maximum possible rate of recombination.

The fact that the intercell connectors, constituted by the connector portions 28, extend over a minor proportion of the length of the cell element defining strips means that the maximum area available for intercell leakage currents is relatively small. The fact that the battery is of reduced electrolyte, "recombinant" type means that the electrolyte rarely if ever need be topped up, and that there is a reduced (or even zero) amount of free electrolyte available for the conduction of intercell leakage currents.

However a great many modifications may be made to the specific construction of battery described. Thus although the frames have been shown as formed in integral pairs, which construction slightly reduces the amount of welding required and means that only one mould is required instead of two moulds of different construction the frames may be formed as quite separate units. Instead of being connected by a heat-welded butt joint the frames may be connected by any suitable means, such as adhesive. Even a mechanical interconnection such as a snap-fit tongue and groove connection may be adequate since intercell leakage is not a grave problem in such reduced electrolyte batteries. Instead of using six strips of separator material, a single sheet may be used for each frame. By using adhesive or welding for a sufficiently long time the seal between adjacent frames through the separator material may be made adequate.

Instead of being pasted with positive and negative active electrode material respectively, it may be simpler if adjacent electrode grids carry a common universal active electrode material capable of acting as either polarity.

One suitable universal paste composition comprises:
60 lbs of Hardinge grey oxide
12 grams of fibre
82 grams of Vanisperse CB (a lignosulphonate material)
3.47 liters of water
1.93 liters of 1.400 sp. gravity sulphuric acid.

This is a readily converted electrochemically in the cell either to positive or negative active form.

Details of Vanisperse CB are given in British Pat. specification No. 1,396,308.

Whilst the battery has been described as being of recombinant reduced electrolyte type it will be appreciated that the invention is equally applicable to conventional batteries which are flooded with electrolyte.

What we claim as our invention and desire to secure by Letters Patent is:

1. A multicell electric storage battery including a plurality of substantially planar frames of insulating material having two surfaces, each said frame comprising a perimeter member and one or more division elements, said perimeter member and said division elements together defining two or more active material support spaces, said frames being arranged in a stack extending in a direction normal to the plane of said frames, said perimeter member and said division elements of each said frame being connected to those of adjacent said frames, each said active material support space receiving an electrode, and every alternate said division member having on one of said surfaces a connector recess extending over a minor proportion of its length, the connector recesses on adjacent said frames being in division elements that are offset from one another, the active material support spaces on each side of each said division element in which a connector recess is formed receiving electrodes which are connected together by a connector which is received in said recess in said division element.

2. A multicell electric storage battery containing electrolyte, said battery including a plurality of substantially planar frames of an insulating material having two surfaces, each said frame comprising a perimeter member and one or more division elements, said perimeter member and said division elements together defining two or more active material support spaces, said frames being arranged in a stack extending in a direction normal to the plane of said frames, said perimeter member and said division elements of each said frame being connected to those of adjacent said frames, each said active material support space receiving an electrode and every alternate said division member having on one of said surfaces a connector recess extending over a minor proportion of its length, the connector recesses on adjacent frames being in division elements that are offset from one another, the active material support spaces on each side of each said division element in which a connector recess is formed receiving electrodes which are connected together by a connector which is received in said recess in said division element, juxtaposed electrodes being separated from each other by compressible absorbent fibrous material resistant to said electrolyte and having an electrolyte absorption ratio of at least 100%, the cells of said battery containing essentially no free unabsorbed electrolyte.

3. A battery as claimed in claim 1 or claim 2 in which every alternate said division member of each said frame has two connector recesses formed in it.

4. A battery as claimed in claim 1 or claim 2 in which each said connector recess is formed adjacent the perimeter member.

5. A battery as claimed in claim 1 or claim 2 in which that portion of each said division element of each said frame which overlies a connector recess in said division elements of the adjacent frame has an elongate recess formed in it which communicates with the exterior of the perimeter member, said connector recess and said longitudinal recess being filled with a sealing material which seals the said connector in said connector recess.

6. A battery as claimed in claim 1 or claim 2 in which each said electrode grid carries active material of opposite polarity to that of the adjacent grids in the same frame and in the adjacent frames.

7. A battery as claimed in claim 1 or claim 2 in which at least every alternate said frame has a terminal recess formed in the perimeter member on that side of said frame in which said connector recesses are formed, said terminal recess accommodating a terminal projection connected to an electrode grid, said terminal projection extending from the inside to the outside of said battery.

8. A battery as claimed in claim 1 or claim 2 in which each said connector recess includes a groove extending along the length of its respective division element and communicating with its associated elongate groove, on either side of said groove there being a shallow recess extending to the edge of said division element.

* * * * *